United States Patent
Yoon et al.

(10) Patent No.: US 11,958,941 B2
(45) Date of Patent: Apr. 16, 2024

(54) POLYMER FOR GEL POLYMER ELECTROLYTE, GEL POLYMER ELECTROLYTE AND LITHIUM SECONDARY BATTERY COMPRISING THE SAME

(71) Applicant: LG Chem, Ltd., Seoul (KR)

(72) Inventors: Jeongae Yoon, Daejeon (KR); Solji Park, Daejeon (KR); Kyoung Ho Ahn, Daejeon (KR); Sujeong Kim, Daejeon (KR); Chul Haeng Lee, Daejeon (KR); Sung Soo Yoon, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 519 days.

(21) Appl. No.: 17/295,994

(22) PCT Filed: Aug. 10, 2020

(86) PCT No.: PCT/KR2020/010564
§ 371 (c)(1),
(2) Date: May 21, 2021

(87) PCT Pub. No.: WO2021/025544
PCT Pub. Date: Feb. 11, 2021

(65) Prior Publication Data
US 2022/0025126 A1    Jan. 27, 2022

(30) Foreign Application Priority Data

Aug. 8, 2019  (KR) .......................... 10-2019-0096806

(51) Int. Cl.
*H01M 10/0525*   (2010.01)
*C08G 77/442*   (2006.01)
*H01M 10/0565*   (2010.01)

(52) U.S. Cl.
CPC ...... *C08G 77/442* (2013.01); *H01M 10/0525* (2013.01); *H01M 10/0565* (2013.01); *H01M 2300/0082* (2013.01); *H01M 2300/0085* (2013.01)

(58) Field of Classification Search
CPC ......... H01M 10/0525; H01M 10/0565; H01M 2300/0082; H01M 2300/0085; C08G 77/442
See application file for complete search history.

(56) References Cited

U.S. PATENT DOCUMENTS

| 2007/0100078 A1 | 5/2007 | Li et al. |
| 2011/0053042 A1 | 3/2011 | Yamada et al. |
| 2013/0172502 A1 | 7/2013 | Kaneumi |
| 2014/0315080 A1 | 10/2014 | Abusleme et al. |
| 2015/0010848 A1 | 1/2015 | Suzuki et al. |
| 2015/0104691 A1 | 4/2015 | Nakamura et al. |
| 2015/0221983 A1 | 8/2015 | Kamiya et al. |
| 2016/0072148 A1 | 3/2016 | Lee et al. |
| 2018/0115006 A1 | 4/2018 | Lee et al. |
| 2021/0163782 A1 | 6/2021 | Matukawa |

FOREIGN PATENT DOCUMENTS

| CN | 101177485 A | 5/2008 |
| CN | 102757535 A | 10/2012 |
| CN | 103080165 A | 5/2013 |
| CN | 103183775 A | 7/2013 |
| CN | 103360540 A | 10/2013 |
| CN | 105061770 A | 11/2015 |
| CN | 112292429 A | 1/2021 |
| EP | 3812434 A1 | 4/2021 |
| JP | 2007500280 A | 1/2007 |
| JP | 2013189595 A | 9/2013 |
| JP | 2015076351 A | 4/2015 |
| KR | 100796989 B1 | 1/2008 |
| KR | 20090049851 A | 5/2009 |
| KR | 100948267 B1 | 3/2010 |
| KR | 20100103880 A | 9/2010 |
| KR | 20150052192 A | 5/2015 |
| KR | 20160029599 A | 3/2016 |
| KR | 20180045813 A | 5/2018 |

OTHER PUBLICATIONS

International Search Report for Application No. PCT/KR2020/010564 dated Nov. 24, 2020, pp. 1-3.

Liu, Y. et al., "Synthesis, characterization and electrochemical properties of poly(methyl methacrylate)-grafted-poly (vinylidene fluoride-hexafluoropropylene) gel electrolytes", Solid State Ionics, May 2002, pp. 317-326, vol. 150, Elsevier, Singapore.

Zhang, Jiawen et al., "Polymers/zeolite nanocomposite membranes with enhanced thermal and electrochemical performances for lithium-ion batteries", Journal of Membrane Science, Jul. 2018, pp. 753-761, vol. 564, Elsevier, China.

(Continued)

*Primary Examiner* — Jane J Rhee

(74) *Attorney, Agent, or Firm* — Lerner David LLP

(57) ABSTRACT

A polymer for a gel polymer electrolyte, a gel polymer electrolyte and a lithium secondary battery comprising the same are disclosed herein. In some embodiments, a polymer for the gel polymer electrolyte includes a copolymer having a main chain and a first side chain and a second side chain bonded to the main chain, wherein the main chain contains a fluoropolymer, wherein the first side chain contains a siloxane group and the second side chain contains an acrylic polymer. The polymer improves stability of a gel polymer electrolyte and a lithium secondary battery including the same.

11 Claims, No Drawings

(56) References Cited

OTHER PUBLICATIONS

Search Report dated Mar. 25, 2022 from the Office Action for Chinese Application No. 202080006315.0 dated Mar. 30, 2022, 3 pages. [See p. 2, categorizing the cited references].
Chrusciel, J.J. et al., "Modification of Thermoplastics with Reactive Silanes and Siloxanes", Thermoplastic Elastomers, Dec. 2012, pp. 155-192, URL:http://cdn.intechopen.com/pdfs-wm/3406. XP055273486.
Extended European Search Report including Written Opinion for Application No. 20849471.6 dated Jan. 27, 2022, pp. 1-9.

POLYMER FOR GEL POLYMER ELECTROLYTE, GEL POLYMER ELECTROLYTE AND LITHIUM SECONDARY BATTERY COMPRISING THE SAME

CROSS-REFERENCE TO RELATED APPLICATION(S)

The present application is a national phase entry under 35 U.S.C. § 371 of International Application No. PCT/KR2020/010564, filed on Aug. 10, 2020, which claims priority from Korean Patent Application No. 10-2019-0096806, filed on Aug. 8, 2019, the entire contents of which are incorporated by reference herein.

TECHNICAL FIELD

One aspect of the present disclosure relates to a polymer for a gel polymer electrolyte, a gel polymer electrolyte, and a lithium secondary battery comprising the same.

BACKGROUND ART

In recent years, as the electric, electronic, communication, and computer industries are rapidly developed, the demand for a lithium secondary battery having high performance and high stability is gradually increasing. In particular, according to the trend of miniaturization and weight reduction of these electronic and communication devices, there is a demand for thinning and miniaturization of a lithium secondary battery, which is a key component in these fields.

The lithium secondary battery can be classified into a lithium ion battery using a liquid electrolyte and a lithium polymer battery using a polymer electrolyte according to the applied electrolyte.

The lithium ion battery has the advantage of high capacity. However, since a liquid electrolyte containing a lithium salt is used, there is a risk of leakage and explosion, and there is a disadvantage in that the battery design becomes complicated due to a countermeasure against it.

On the other hand, since the lithium polymer battery uses a solid polymer electrolyte or a gel polymer electrolyte containing a liquid electrolyte solution as an electrolyte, it has flexibility while improving stability, so it can be developed in various forms such as small size or thin film type.

The lithium secondary battery to which the gel polymer electrolyte is applied can be manufactured by two methods as follows.

First, an electrolyte composition is prepared by mixing a polymerization initiator and a polymerizable monomer or oligomer in a liquid electrolyte solution in which an electrolyte salt is dissolved in a non-aqueous organic solvent. The electrolyte composition may be injected into a battery containing an electrode assembly, and gelled (crosslinked) under an appropriate temperature and time condition to manufacture a lithium secondary battery comprising a gel polymer electrolyte.

However, in the case of the above method, there is a disadvantage that it is not easy to secure mechanical strength even after gelation because the wetting property in the cell is poor due to the problem of the high viscosity and surface tension of the solution before injecting the electrolyte composition.

As another method, an electrolyte composition is coated on one surface of an electrode and a separator, and cured (gelled) using heat or UV to form a gel polymer electrolyte. The battery may be manufactured by winding or laminating the electrode and/or separator on which the gel polymer electrolyte is formed to manufacture an electrode assembly, inserting it into a battery case, and re-injecting an existing liquid electrolyte solution.

However, this method has a problem in that a process of irradiating heat or UV for gelation is required, and moisture is absorbed in the case of a gel-coated separator, which lowers the performance and stability of the battery. Moreover, since the conventional polyethylene separator used as a separator has a high heat shrinkage rate, a short circuit occurs between the positive electrode and the negative electrode when the temperature rises under conditions such as abnormal use, causing a problem in the stability of the battery.

Therefore, it is necessary to develop a method for preparing a gel polymer electrolyte with improved safety against external impact, while securing mechanical strength and ion transport capability.

PRIOR ART DOCUMENT (Patent Document 1) Korean Patent Laid-open Publication No. 2009-0049851
(Non-Patent Document 1) SOLID STATE IONICS, 150(3-4), 317-326

DISCLOSURE

Technical Problem

Therefore, as a result of conducting various studies to solve the above problems, the inventors of one aspect of the present disclosure have prepared a polymer for the gel polymer electrolyte containing a copolymer obtained by grafting a side chain containing a siloxane group and a side chain containing an acrylic polymer into a main chain containing a fluoropolymer and have confirmed that the stability of an electrolyte and a lithium secondary battery containing the polymer for the gel polymer electrolyte is improved.

Therefore, it is an object of one aspect of the present disclosure to provide a polymer for the gel polymer electrolyte that can improve the stability of a gel polymer electrolyte and a lithium secondary battery.

It is another object of one aspect of the present disclosure to provide a gel polymer electrolyte comprising the polymer for the gel polymer electrolyte.

It is still another object of one aspect of the present disclosure to provide a lithium secondary battery comprising the gel polymer electrolyte.

Technical Solution

In order to achieve the above objects, one aspect of the present disclosure provides a polymer for the gel polymer electrolyte comprising a copolymer which comprises a main chain containing a fluoropolymer, and a side chain containing a siloxane group grafted to the main chain and a side chain containing an acrylic polymer.

One aspect of the present disclosure also provides a gel polymer electrolyte comprising the polymer for the gel polymer electrolyte.

Another aspect of the present disclosure also provides a lithium secondary battery comprising a positive electrode, a negative electrode, a separator interposed therebetween, and the aforementioned gel polymer electrolyte.

Advantageous Effects

The polymer for the gel polymer electrolyte of one aspect of the present disclosure can remove radicals due to the fluoropolymer contained in the main chain, can improve the stability of the electrolyte solution by helping to form a solid electrolyte interphase (SEI) with high stability on the electrode surface due to the siloxane group contained in the side chain, and also exhibits high solubility in an electrolyte solution due to the acrylic polymer contained in the side chain.

Therefore, when the polymer for the gel polymer electrolyte is applied to a gel polymer electrolyte for a lithium secondary battery, it has high stability in the electrolyte solution and can remove radicals by a fluorine group, thereby exhibiting the effect of suppressing the exothermic reaction of the positive electrode.

BEST MODE

Hereinafter, the present invention will be described in detail.

The terms and words used in the present specification and claims should not be construed as limited to ordinary or dictionary terms, and should be construed in a sense and concept consistent with the technical idea of the present invention, based on the principle that the inventor can properly define the concept of a term to describe his invention in the best way possible.

The terminology used herein is for the purpose of describing particular embodiments only and is not intended to be limiting of the present invention. The singular forms "a," "an," and "the" include plural referents unless the context clearly dictates otherwise. It is to be understood that the terms "comprise", or "have", etc., as used in the present specification, are intended to designate the presence of stated features, numbers, steps, operations, components, parts or combinations thereof, but not to preclude the possibility of the presence or addition of one Or more other features, numbers, steps, operations, components, parts, or combinations thereof.

The term "polymerization unit of acrylic monomer" as used herein refers to a state in which the acrylic monomer forms a skeleton such as a main chain or a side chain through a polymerization reaction.

Polymer for the Gel Polymer Electrolyte

One aspect of the present disclosure relates to a polymer for a gel polymer electrolyte, wherein the polymer for the gel polymer electrolyte may comprise a copolymer comprising a main chain containing a fluoropolymer, and a side chain containing a siloxane group grafted to the main chain and a side chain containing an acrylic polymer.

In one aspect of the present disclosure, the fluoropolymer may be a polymer represented by Formula 3 below. For example, the fluoropolymer may be a polymer including a polymerization unit of poly(chlorotrifluoroethylene) (PCTFE):

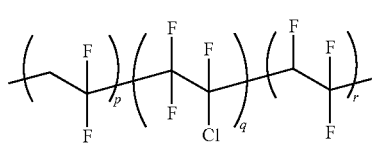

[Formula 3]

in Formula 3, p, q, and r are each independently real numbers of 0≤p≤20,000, 1≤q≤22,000 and 0≤r≤15,000.

In addition, the fluoropolymer may comprise a two components copolymer of vinylidene fluoride (VdF) and chlorotrifluoroethylene (CTFE); or a three components copolymer of VdF, CTFE, and trifluoroethylene (TrFE), and the fluoropolymer may necessarily comprise CTFE.

In addition, the fluoropolymer may be included in an amount of 2 to 80 wt % based on the total weight of the polymer for the gel polymer electrolyte. Specifically, the content of the fluoropolymer may be 2 wt % or more, 5 wt % or more, or 10 wt % or more, and may be 70 wt % or less, 75 wt % or less, or 80 wt % or less. If the content of the fluoropolymer is less than 2 wt %, the effect of inhibiting side reactions of the battery based on the radical removal may be insignificant. If the content of the fluoropolymer is more than 80 wt %, the solubility in a general electrolyte solution containing a cyclic carbonate-based solvent and a linear carbonate-based solvent as main components may be reduced.

The polymer for the gel polymer electrolyte according to one aspect of the present disclosure may be one in which a side chain containing a siloxane group that may increase stability in an electrolyte solution is introduced onto the fluoropolymer. According to an embodiment of one aspect of the present disclosure, the side chain containing the siloxane group may be grafted to the Cl position on the CTFE by a graft-onto method.

In addition, the polymer for the gel polymer electrolyte according to one aspect of the present disclosure may be one in which a side chain containing an acrylic polymer is introduced onto the fluoropolymer in order to increase surface energy and improve solubility in an electrolyte solution. According to an embodiment of one aspect of the present disclosure, the side chain containing the acrylic polymer may be grafted onto the main chain containing the fluoropolymer by a graft-onto method or a graft-from copolymerization using an atom transfer radical polymerization (hereinafter, ATRP).

The fluoropolymer may improve the stability at high temperature and high voltage of a battery.

In one aspect of the present disclosure, the polymer for the gel polymer electrolyte may be a copolymer represented by Formula 1 below:

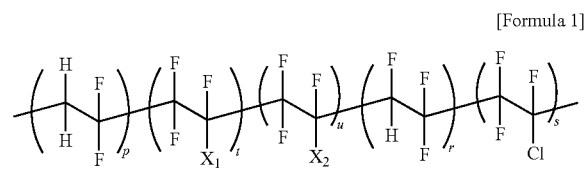

[Formula 1]

where in Formula 1, p, r, s, t, and u are each independently real numbers of 0≤p≤20,000, 0≤r≤15,000, 0≤s<22,000, and 0<t+u≤22,000, $X_1$ is a side chain containing a siloxane group represented by Formula 2 below, $X_2$ is a side chain containing an acrylic polymer.

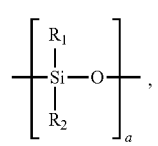

[Formula 2]

wherein in Formula 2, $R_1$, and $R_2$ are each independently hydrogen, $C_1$ to $C_6$ alkyl, $C_1$ to $C_6$ alkoxy, or phenyl, and a is a real number of 2 to 400. In this case, $R_1$ and $R_2$ may be the same as or different from each other.

In one aspect of the present disclosure, the polymer for the gel polymer electrolyte comprising the copolymer represented by Formula 1 may have a molecular weight of 500 to 2,000,000 and preferably 1,000 to 2,000,000. If the molecular weight of the polymer for the gel polymer electrolyte is less than 500, the effect of improving the stability of the battery is insignificant. If the molecular weight of the polymer for the gel polymer electrolyte exceeds 2,000,000, it may act as a source of resistance in the battery.

In one aspect of the present disclosure, the side chain containing the siloxane group represented by Formula 2 may be one grafted onto the main chain containing the fluoropolymer. The side chain containing the siloxane group has low solubility in the solvent used in the electrolyte due to its low surface energy and low polarity, and may play a role of improving the stability of the electrolyte solution by inhibiting the generation of HF caused by the side reaction of the electrolyte solution. The side chain containing the siloxane group may mean a side chain containing a polymer containing the siloxane group.

The side chain containing the siloxane group may have a molecular weight of 150 to 50,000, preferably 500 to 30,000. If the molecular weight of the siloxane group-containing polymer is less than 150, the effect of improving the stability of the battery is insignificant. If the molecular weight of the siloxane group-containing polymer is more than 50,000, it may act as a source of resistance in the battery.

In one aspect of the present disclosure, the acrylic polymer may be one grafted onto the main chain containing the fluoropolymer. The acrylic polymer may play a role in controlling the solubility in the electrolyte solution, controlling the viscosity, and controlling the stability of the electrolyte solution.

The acrylic polymer may have a molecular weight of 500 or more, and preferably 500 to 100,000. If the molecular weight of the acrylic polymer is less than 500, the effect of improving the solubility in the electrolyte solution is insignificant. If the molecular weight of the acrylic polymer exceeds 100,000, it may act as a source of resistance in the battery.

Since the acrylic polymer contains a carbonyl group, the acrylic polymer has a higher surface energy than the fluoropolymer, and the value of the surface energy may be easily adjusted depending on the type of acrylic monomer used to form the acrylic polymer.

The acrylic polymer may comprise a polymerization unit of an acrylic monomer. In this case, the polymerization unit of the acrylic monomer refers to a state in which the acrylic monomer forms a skeleton such as a main chain or a side chain of an acrylic polymer formed through a polymerization reaction.

In addition, the acrylic monomer may comprise at least one selected from the group consisting of acrylic acid, methacrylic acid, and derivatives thereof. Specifically, the acrylic monomer may be methyl (meth)acrylate, ethyl (meth)acrylate, n-propyl (meth)acrylate, isopropyl (meth) acrylate, n-butyl (meth)acrylate, t-butyl (meth) acrylate, pentyl (meth) acrylate, 2-ethylbutyl (meth) acrylate, 2-ethylhexyl (meth) acrylate, n-octyl (meth)acrylate, isooctyl (meth)acrylate, isononyl (meth)acrylate, or lauryl (meth) acrylate, poly(alkylene oxide) (meth)acrylate, poly(alkylene oxide) monoalkyl ether (meth)acrylate, poly(alkylene oxide) monophenyl ether (meth)acrylate and the like, but is not limited thereto.

In addition, the acrylic polymer may further comprise a non-acrylic polymer. The non-acrylic polymer may be exemplified by styrene, α-methylstyrene, p-methylstyrene, p-methoxystyrene, (meth)acrylonitrile, vinyl carbonate and the like, but is not limited thereto.

In one aspect of the present disclosure, the polymerization unit of the acrylic monomer may be contained in an amount of 30 wt % or more, 35 wt % or more, or 40 wt % or more based on the total weight of the acrylic polymer. In addition, the acrylic monomer may be contained in an amount of 100 wt % or less, 95 wt % or less, 90 wt % or less, 85 wt % or less, 80 wt % or less, 75 wt % or less, 70 wt % or less, or 65 wt % or less, based on the total weight of the acrylic polymer. If the polymerization unit of the acrylic monomer is less than 30 wt %, the solubility of the general electrolyte solution containing the cyclic carbonate-based solvent and the linear carbonate-based solvent as main components may be reduced.

The weight ratio of the content of the main chain (F) containing the fluoropolymer and the sum (F:$X_1$+$X_2$) of the contents of the side chain containing the siloxane group ($X_1$) and the side chain containing the acrylic polymer ($X_2$) according to one aspect of the present disclosure may be 1:99 to 30:70, preferably 2:98 to 25:65 parts by weight. If the content of the main chain (F) containing the fluoropolymer is less than the weight ratio, or the sum of the contents of the side chains exceeds the weight ratio, since the radical removal effect by the fluoropolymer is insignificant, the effect of improving the stability at high temperature of the battery may be insignificant. In addition, if the content of the main chain (F) containing the fluoropolymer exceeds the weight ratio, or the sum of the contents of the side chains is less than the weight ratio, since the surface energy of the polymer for the gel polymer electrolyte is low, the wetting property of the electrode may not be sufficient.

In addition, the weight ratio of the side chain containing the siloxane group ($X_1$) and the side chain containing the acrylic polymer ($X_2$) may be 1:99 to 80:20, preferably 2:98 to 50:50. If the content of the side chain containing the siloxane group ($X_1$) exceeds the above range, since the polymer for the gel polymer electrolyte has low surface energy, the wetting property of the electrode is insufficient and the solubility of the polymer for the gel polymer electrolyte in the electrolyte solution is insufficient. If the content of the side chain containing the siloxane group ($X_1$) is less than the above range, the effect of inhibiting the side reaction of the electrolyte solution is insignificant due to the low content of the siloxane group, and the intended purpose of improving the stability at high temperature of the battery cannot be achieved.

In addition, the polymer for the gel polymer electrolyte according to one aspect of the present disclosure may further comprise a polymerization unit derived from a monomer containing a curable functional group in the grafted chain for the purpose of further improving the stability at high temperature of the positive electrode. At this time, the polymerization unit derived from the monomer containing the curable functional group refers to a state in which the monomer containing the curable functional group forms a skeleton such as a main chain or a side chain through a polymerization reaction.

The monomer containing the curable functional group may be a monomer containing one or more functional groups selected from a carboxylic acid group, a hydroxyl group, a vinyl group, an alkoxysilyl group, a phosphate group, a succinate group, a phthalate group, and an isocyanate group.

Specifically, the monomer containing the curable functional group may be at least one selected from the group consisting of (meth)acrylic acid, 2-hydroxyethyl (meth)acrylate, hydroxypropyl (meth) acrylate, 4-hydroxybutyl (meth)acrylate, vinyl (meth)acrylate, allyl (meth)acrylate, 2-(vinyloxy)ethyl methacrylate. (3-trialkoxysilyl)propyl (meth)acrylate, 3-(dialkoxysilyl)propyl (meth)acrylate, (meth) acryloyloxypropyl phosphate, (meth) acryloyloxyethyl isocyanate, 2-(meth)acryloyloxyethyl succinate, 2-(meth)acryloyloxyethyl phthalate, and 2-(N,N-diethylamino)ethyl (meth)acrylate, and preferably may be at least one selected from the group consisting of 2-hydroxyethyl (meth) acrylate, 4-hydroxybutyl (meth) acrylate, allyl (meth)acrylate, and (3-trialkoxysilyl)propyl (meth) acrylate.

In addition, among the polymerization units derived from the monomer containing the curable functional group, the polymerization unit derived from a monomer containing a vinyl group may be secondarily derived from a (meth) acrylate that does not contain a vinyl group through a polymerization reaction. For example, a (meth)acrylate group may be introduced into the side chain by copolymerizing (meth)acrylate containing a hydroxyl group and condensing with 2-isocyanatoethyl (meth)acrylate, and conversely, after copolymerization of (meth)acrylate containing an isocyanate group, it may be condensed with (meth) acrylate containing a hydroxyl group. The kind of polymerization reaction used to introduce a vinyl group into the side chain is not limited, but, for example, urethane formation reaction of hydroxyl group-isocyanate group, ester group formation reaction of epoxy group-carboxylic acid group, nucleophilic substitution reaction of amine group-halogen group (SN2, (S: Substitution, N: Nucleophilic, 2: Bimolecular)) and the like may be exemplified.

Preparation Method of the Polymer for the Gel Polymer Electrolyte

The method of preparing the polymer for the gel polymer electrolyte according to another aspect of the present disclosure may appropriately use a graft-from or graft-onto method. The graft-from method may be a graft-from copolymerization method using atom transfer radical polymerization (atom transfer radical polymerization, hereinafter ATRP).

In another aspect of the present disclosure, the graft-from method may be selected as a method of introducing a side chain containing an acrylic polymer in a branched side chain, and may include a mixing step and a polymerization step.

In the above, the mixing step may be a step of forming a mixture by mixing raw materials for producing a side chain polymer on a fluoropolymer, and one exemplary mixing step may be a step of mixing a fluoropolymer, an acrylate monomer to be polymerized, and a solvent. Thereafter, a step of additionally mixing the catalyst and the ligand with the solvent may be performed.

The fluoropolymer is a part that becomes the main chain of the grafted polymer, and a specific example thereof is as described above, and in one embodiment according to another aspect of the present disclosure, may be polychlorotrifluoroethylene (hereinafter, PCTFE). In one embodiment of another aspect of the present disclosure, the acrylate monomer may be butyl acrylate (hereinafter, BA).

The solvent may be selected form a variety of solvents known in the art, and may be, for example, but is not limited to, N-methyl-2-pyrrolidone (NMP), gamma-butyrolactone (GBL) dimethylformamide (DMF), dimethyl sulfoxide (DMSO), dimethylacetamide (DMAc), acetonitrile (AcCN), ethyl acetate (EA), methylethyl ketone (MEK), or tetrahydrofuran (THF), etc.

Further, in addition to the mixed solution, a catalyst and a ligand may be mixed with a solvent.

The catalyst may be exemplified by, for example, $Cu(I)Cl$, $Cu(II)Cl_2$, $Cu(I)Br$, $Cu(II)Br_2$, $Fe(II)Cl_2$, $Fe(III)Cl_3$ or a mixture thereof, but may preferably be exemplified by $Cu(I)Cl$, $Cu(II)Cl_2$, $Cu(I)Br$, $Cu(II)Br_2$ or a mixture thereof.

In addition, the content of the catalyst may be 0.0001 to 1 parts by weight, preferably 0.0005 to 0.5 parts by weight, more preferably 0.001 to 0.1 parts by weight, based on 100 parts by weight of the mixture. If the content of the catalyst is less than 0.0001 parts by weight, the reaction is very delayed. If the content of the catalyst exceeds 1 part by weight, there is a problem that gelation occurs prior to generation of the polymerized graft polymer or it is very difficult to remove the catalyst. Therefore, the content of the catalyst is appropriately selected within the above range.

The ligand is not particularly limited as long as it may be combined with the catalyst and used in the polymerization reaction.

For example, the ligand may be exemplified by a ligand having one or more nitrogen, oxygen, phosphorus and sulfur atoms capable of coordinating with the catalyst through σ-bonding or a ligand containing two or more carbon atoms capable of coordinating with a catalyst through a π-bond. etc., but is not limited thereto, and specifically may be, but is not limited to, at least one selected from the group consisting of N,N,N',N'',N''-pentamethyldiethylenetriamine (PMDETA), 2,2'-bipyridine (bpy), 4,4'-di-5-nonyl-2,2'-bipyridine (dNbpy), tris(2-pyridylmethyl)amine (TPMA), and tris(2-dimethylaminoethyl)amine (Me6TREN).

The content of the ligand may be 50 to 2000 parts by weight, preferably 100 to 1000 parts by weight, more preferably 200 to 500 parts by weight, based on 100 parts by weight of the catalyst. If the content of the ligand is less than 50 parts by weight, the formation of a metal complex by binding to the catalyst is too little, and the reaction is very slow or does not proceed. If the content of the ligand is more than 2000 parts by weight, the production costs may increase, and there is a concern that side reactions may occur due to the use of an excessive amount of ligand.

In addition, the ATRP reaction may use catalyst reducing agents as needed. The reducing agents may be exemplified by organic reducing agents, inorganic reducing agents, and radical generators, but are not limited thereto.

If the catalyst and ligand of the ARTP reaction, and if necessary, a reducing agent as a catalyst are mixed and stirred at 30° C. to 100° C., ATRP reaction may occur to obtain a grafted polymer.

A step of removing the catalyst and unreacted monomer by precipitating the polymer generated after the grafting polymerization reaction in an appropriate nonsolvent may be further performed. Thereafter, a step of drying the polymer in a vacuum condition is performed to obtain a grafted fluoropolymer according to another aspect of the present disclosure.

In another aspect of the present disclosure, the graft-onto method may be selected as a method of introducing a side chain containing a silicon group and a side chain containing an acrylic polymer among the branched side chains. The method of introducing the side chain containing the silicone group, for example, is capable of substituting a polydimethylsiloxane (hereinafter, PDMS) containing a nucleophilic functional group such as a hydroxyl group or an amine group at the end, at the position of the Cl group of CTFE, under the presence of powerful reducing agents such as LiH, NaH or LiBH$_4$, and, as a result, a branched polymer may be formed.

The method of introducing the side chain containing the acrylic polymer onto the fluoropolymer by the graft-onto method is a step of forming a polymer in which a nucleophilic functional group is introduced at the end, wherein such a polymer may be synthesized using living polymerization methods such as ATRP method or Reversible Addition-Fragmentation Chain Transfer (RAFT) polymerization method. For example, the polymer for the side chain containing the hydroxy terminal may be synthesized using an ATRP initiator containing a hydroxyl group, or the polymer for the side chain containing the thiol group may be synthesized by reducing the terminal RAFT functional group after RAFT polymerization.

The nucleophilic functional group may be substituted at the position of the Cl group of CTFE under the presence of a powerful reducing agent such as LiH, NaH or LiBH$_4$, and as a result, a branched polymer may be formed.

Gel Polymer Electrolyte

The gel polymer electrolyte according to another aspect of the present disclosure may comprise a polymer for the gel polymer electrolyte as described above together with a conventional electrolyte composition, for example, a non-aqueous solvent and a lithium salt.

The polymer for the gel polymer electrolyte of another aspect of the present disclosure may be contained in an amount of 0.01 wt % or more, 0.1 wt % or more, or 0.5 wt % or more, and may be contained in an amount of 3 wt % or less, 5 wt % or less, 10 wt % or less, 20 wt % or less, or 30 wt % or less, based on the total weight of the gel polymer electrolyte. If added below the above range, it is difficult to form a network reaction between polymers to form the gel polymer electrolyte, and the effect of improving the stability of the positive electrode of another aspect of the present disclosure may be insignificant. If added in excess of the above range, the viscosity of the gel polymer electrolyte increases excessively, and the viscosity exceeds a certain level, thereby reducing impregnation and wetting properties in the battery, and impairing electrochemical stability.

In the case of conventional gel polymer electrolyte, there is a problem that the ionic conductivity and the like are lower than that of a liquid electrolyte, and stability and mechanical properties are relatively weak as compared to a solid polymer electrolyte.

However, the polymer for the gel polymer electrolyte of the present invention form (crosslink) or may form (crosslink) a polymer network, thereby forming a network in the gel polymer electrolyte, or may be dispersed in the gel polymer electrolyte to improve ionic conductivity and mechanical properties through physical/chemical bonding, and since the polymer for the gel polymer electrolyte of the present invention has low volatility and thus high electrochemical safety, flame retardant properties may also be improved.

Meanwhile, the gel polymer electrolyte according to another aspect of the present disclosure is one formed by polymerizing a polymer for the gel polymer electrolyte according to a conventional in-situ polymerization or coating polymerization method known in the art, and one formed by applying and dispersing a polymer for the gel polymer electrolyte in an electrolyte.

More specifically, the in-situ polymerization is a method of preparing a gel polymer electrolyte through (a) a step of inserting an electrode assembly consisting of a positive electrode, a negative electrode, and a separator interposed between the positive electrode and the negative electrode into a battery case; and (b) a step of injecting the gel polymer electrolyte composition according to another aspect of the present disclosure into the battery case and polymerizing it.

The in-situ polymerization reaction in the lithium secondary battery is possible through E-BEAM, gamma ray, room temperature/high temperature aging process, and may be performed through thermal polymerization or photopolymerization. In this case, the polymerization time may take about 2 minutes to 24 hours, the thermal polymerization temperature may be 30 to 100° C., and the photopolymerization temperature may be room temperature (5 to 30° C.)

More specifically, the in-situ polymerization reaction in the lithium secondary battery involves injecting the gel polymer electrolyte composition into a battery cell, and then forming a gel polymer electrolyte in a gelled form by gelation through the polymerization reaction or forming a gel polymer electrolyte in a dispersed form without gelation through the polymerization reaction.

In another method, it may be prepared by coating a gel polymer electrolyte composition containing the polymer for the gel polymer electrolyte on one surface of an electrode and a separator, curing (gelling) it using heat or light such as UV, and then winding or laminating an electrode and/or a separator, on which a gel polymer electrolyte is formed, to manufacture an electrode assembly, and inserting it into the battery case and injecting the existing liquid electrolyte solution again.

Preparation Method of Gel Polymer Electrolyte

The gel polymer electrolyte according to another aspect of the present disclosure may be prepared by using a gel polymer electrolyte composition in which the polymer for the gel polymer electrolyte as described above is dissolved in a mixture of a non-aqueous solvent, a polymerization initiator, and a lithium salt that are commonly used. In addition, the gel polymer electrolyte composition may further contain a multifunctional crosslinking agent and/or additive.

Non-Aqueous Solvent

In another aspect of the present disclosure, the non-aqueous solvent is a solvent for an electrolyte solution commonly used in a lithium secondary battery, and may be, for example, ethers, esters (acetates, propionates), amides, linear carbonate compounds or cyclic carbonate compounds, nitriles (acetonitrile, SN, etc.), respectively, alone or in combination of two or more.

Among them, representatively, a carbonate-based solvent comprising a cyclic carbonate compound, a linear carbonate compound, or a mixture thereof may be used.

The non-aqueous solvent is not limited as long as decomposition due to oxidation reactions or the like may be minimized during the charging/discharging process of the secondary battery and it may exhibit the desired properties together with the additive.

Of these, a specific example of the cyclic carbonate compound may be at least one selected from the group consisting of ethylene carbonate (EC), propylene carbonate (PC), 1,2-butylene carbonate, 2,3-butylene carbonate, 1,2-pentylenecarbonate, 2,3-pentylene carbonate, vinylene carbonate, and fluoroethylene carbonate (FEC).

In addition, a specific example of the linear carbonate compound may be at least one selected from the group consisting of dimethyl carbonate (DMC), diethyl carbonate (DEC), dipropyl carbonate, ethylmethyl carbonate (EMC), methylpropyl carbonate, and ethylpropyl carbonate, but is not limited thereto.

In addition, the ester may be at least one selected from a linear ester compound and a cyclic ester compound.

A specific example of the linear ester compound may be at least one selected from the group consisting of methyl acetate, ethyl acetate, propyl acetate, methyl propionate, ethyl propionate, propyl propionate, and butyl propionate, but are not limited thereto.

A specific example of the cyclic ester compound may be at least one selected from the group consisting of γ-butyrolactone, γ-valerolactone, γ-caprolactone, σ-valerolactone, and ε-caprolactone, but is limited thereto.

In addition, the ether-based solvent may be at least one selected from the group consisting of dimethylether, diethylether, dipropyl ether, methylethylether, methylpropyl ether, ethylpropyl ether, 1,3-dioxolane (DOL), and 2,2-bis(trifluoromethyl)-1,3-dioxolane (TFDOL), but is not limited thereto.

In addition, the nitrile-based solvent may be at least one selected from the group consisting of acetonitrile, propionitrile, butyronitrile, valeronitrile, caprylonitrile, heptanenitrile, cyclopentane carbonitrile, cyclohexane carbonitrile, 2-fluorobenzonitrile, 4-fluorobenzonitrile, difluorobenzonitrile, trifluorobenzonitrile, phenylacetonitrile, 2-fluorophenylacetonitrile, and 4-fluorophenylacetonitrile, but is not limited thereto.

In addition to the non-aqueous solvent, it may be at least one selected from the group consisting of dimethyl sulfoxide, sulfolane, propylene sulfite, and tetrahydrofuran, but is not limited thereto.

Polymerization Initiator

In another aspect of the present disclosure, the polymerization initiator is for forming a polymer network bonded in a three-dimensional structure by polymerizing the polymer for the gel polymer electrolyte of the present invention, and a conventional polymerization initiator known in the art may be used without limitation. The polymerization initiator may comprise a photo polymerization initiator or a thermal polymerization initiator depending on the polymerization method. Specifically, representative examples of the photopolymerization initiator may comprise at least one selected from the group consisting of 2-hydroxy-2-methylpropiophenone (HMPP), 1-hydroxy-cyclohexylphenyl-ketone, benzophenone, 2-hydroxy-1-[4-(2-hydroxyethoxy)phenyl]-2-methyl-1-propanone, oxy-phenylacetic acid 2-[2-oxo-2 phenyl-acetoxy-ethoxy]-ethyl ester, oxy-phenyl-acetic 2-[2-hydroxyethoxy]-ethyl ester, alpha-dimethoxy-alpha-phenylacetophenone, 2-benzyl-2-(dimethylamino)-1-[4-(4-morpholinyl)phenyl]-1-butanone, 2-methyl-1-[4-(methylthio)phenyl]-2-(4-morpholinyl)-1-propanone, diphenyl (2,4,6-trimethylbenzoyl)-phosphine oxide, bis(2,4,6-trimethylbenzoyl)-phenylphosphine oxide, bis(eta 5-2,4-cyclopentadien-1-yl, bis[2,6-difluoro-3-(1H-pyrrol-1-yl)phenyl]titanium, 4-isobutylphenyl-4'-methylphenyliodonium, hexafluorophosphate, and methylbenzoyl formate.

In addition, representative examples of the thermal polymerization initiator may comprise at least one selected from the group consisting of benzoyl peroxide, acetyl peroxide, dilauryl peroxide, di-tert-butyl peroxide, t-butyl peroxy-2-ethyl-hexanoate, cumyl hydroperoxide and hydrogen peroxide, 2,2'-azobis(2-cyanobutane), 2,2'-azobis(methyl-butyronitrile), 2,2'-azobis(iso-butyronitrile)(AIBN), and 2,2'-azobisdimethyl-valeronitrile (AMVN).

The thermal polymerization initiator may be decomposed by heat of 30° C. to 100° C. or decomposed by light such as UV at room temperature (5° C. to 30° C.) to form a radical and then form a crosslinked bond by free radical polymerization, thereby allowing a polymer to be polymerized.

In addition, in the case of a non-crosslinked dispersed gel polymer, the polymerization initiator may or may not be comprised.

Lithium Salt

The lithium salt according to another aspect of the present disclosure is used as an electrolyte salt in a lithium secondary battery, and is used as a medium for transferring ions. Typically, the lithium salt may be at least one selected from the group consisting of $LiPF_6$, $LiBF_4$, $LiSbF_6$, $LiAsF_6$, $LiClO_4$, $LiN(SO_2F)_2$, $LiN(CF_3SO_2)_2$, $CF_3SO_3Li$, $LiC(CF_3SO_2)_3$, $LiC_4BO_8$, and may preferably be $LiPF_6$, but is not limited thereto.

Meanwhile, in the gel polymer electrolyte, the lithium salt may be contained in an amount of 0.5 to 5M, preferably 0.5 to 4M. If the content of the lithium salt is less than the above range, the concentration of lithium ions in the electrolyte is low, so charging/discharging of the battery may not be properly performed. If the content of the lithium salt exceeds the above range, the viscosity of the gel polymer electrolyte may increase, thereby deteriorating the wetting property in the battery, thereby deteriorating battery performance.

Multifunctional Crosslinking Agent

In one embodiment of another aspect of the present disclosure, when preparing the gel polymer electrolyte, a multifunctional crosslinking agent capable of inducing crosslinking of the polymer for the gel polymer electrolyte is added, so that the stability at high temperature of the battery may be further improved.

The multifunctional crosslinking agent may react with a curable functional group contained in the graft polymer of Formula 2 to form a crosslinked structure between polymers. The protective layer of the electrode formed with the crosslinked structure may exhibit high chemical and electrochemical stability, and may protect the surface of the electrode active material from side reactions with the electrolyte solution to overcome problems such as deterioration of the cycle characteristics of the secondary battery and deterioration of coulombic efficiency.

The type of the multifunctional crosslinking agent is not particularly limited, and the multifunctional crosslinking agent may be any one selected from the group consisting of an isocyanate crosslinking agent, an epoxy crosslinking agent, an aziridine crosslinking agent, an alcohol-based crosslinking agent, an amine-based crosslinking agent, and a vinyl-based crosslinking agent.

Specific examples of the isocyanate crosslinking agent may be diisocyanate compounds such as toluene diisocyanate, xylene diisocyanate, diphenylmethane diisocyanate, hexamethylene diisocyanate, isophorone diisocyanate, tetramethylxylene diisocyanate, or naphthalene diisocyanate, or compounds obtained by reacting the diisocyanate compounds with a polyol. In the above description, for example, trimethylol propane may be used as the polyol.

In addition, specific examples of the epoxy crosslinking agent may comprise at least one selected from the group consisting of ethyleneglycol diglycidyl ether, triglycidyl ether, trimethylolpropane triglycidyl ether, N,N,N',N'-tetraglycidyl ethylenediamine, and glycerin diglycidyl ether. Specific examples of the aziridine crosslinking agent may comprise at least one selected from the group consisting of N,N'-toluene-2,4-bis(1-aziridinecarboxamide), N,N'-diphenylmethane-4,4'-bis(1-aziridinecarboxamide), triethylene melamine, bisisoprotaloyl-1-(2-methylaziridine), and tri-1-aziridinylphosphine oxide, but are not limited thereto. Specific examples of the alcohol crosslinking agent may comprise at least one selected from the group consisting of poly(alkylene glycol), glycerol, trismethylol propane, pentaerythritol, and dipentaerythritol, but are not limited thereto. In addition, specific examples of the amine-based crosslinking agent may comprise at least one selected from the group consisting of ethylene diamine, diethylenetriamine, triethylenetetramine, or modified amines thereof, metaphenylenediamine, diaminodiphenylmethane, diaminodiphenyl sulfone, or modified amines thereof, but are limited thereto. In one embodiment of another aspect of the present disclosure, the vinyl-based crosslinking agent is an organic compound having two or more vinyl groups in one molecule, and may be at least one selected from the group consisting of ethylene glycol di(meth)acrylate, 1,6-hexanediol di(meth)acrylate, tri(propylene glycol) di(meth)acrylate, tris(2-(meth)acryloethyl) isocyanate, trimethylolpropane tri(meth)acrylate, trimethylolpropane ethoxylate tri (meth)acrylate, pentaerythritol di(meth)acrylate, pentaerythritol tri(meth)acrylate, pentaerythritol tetra(meth) acrylate, dipentaerythritol di(meth)acrylate, dipentaerythritol tri(meth)acrylate, dipentaerythritol tetra(meth)acrylate, dipentaerythritol penta (meth)acrylate, and dipentaerythritol hexa (meth)acrylate, but is not limited thereto.

Additive

In another aspect of the present disclosure, the additive may be, for example, additives such as vinylene carbonate (VC), vinyl ethylene carbonate (VEC), propane sultone (PS), succinonitrile (SN), adiponitrile (AdN), ethylene sulfate (ESa), propene sultone (PRS), fluoroethylene carbonate (FEC), $LiPO_2F_2$, lithium difluorooxalatoborate (LiODFB), lithium bis-(oxalato)borate (LiBOB), 3-trimethoxysilanylpropyl-N-aniline (TMSPa), tris(trimethylsilyl) phosphite (TMSPi), and $LiBF_4$.

In addition, inorganic particles may be comprised as the additive, and the inorganic particles may be a single compound selected from the group consisting of $BaTiO_3$, $BaTiO_3$, $Pb(Zr,Ti)O_3$ (PZT), $Pb_{1-a}La_aZr_{1-b}Ti_bO_3$ (PLZT, wherein $0<a<1$, $0<b<1$), $Pb(Mg_{1/3}Nb_{2/3})O_3$—$PbTiO_3$ (PMN-PT), hafnia ($HfO_2$), $SrTiO_3$, $SnO_2$, $CeO_2$, MgO, NiO, CaO, ZnO, $ZrO_2$, $Y_2O_3$, $Al_2O_3$, $Al(OH)_3$, $TiO_2$, $SiO_2$, SiC, and composites thereof, or a mixture of at least two or more thereof.

In addition, inorganic particles with lithium ion transfer ability, namely lithiumphosphate ($Li_3PO_4$), lithium titanium phosphate ($Li_cTi_d(PO_4)_3$, $0<d<2$, $0<d<3$), lithium aluminum titanium phosphate ($Li_{a1}Al_{b1}Ti_{c1}(PO_4)_3$, $0<a1<2$, $0<b1<1$, $0<c1<3$), $(LiAlTiP)_{a2}O_{b2}$ series glass ($0<a2<4$, $0<b2<13$) such as $14Li_2O-9Al_2O_3-38TiO_2-39P_2O_5$, lithium lanthanum titanate ($Li_{a3}La_{b3}TiO_3$, $0<a3<2$, $0<b3<3$), lithium germanium thiophosphate ($Li_{a4}Ge_{b4}Pc2Sd$, $0<a4<4$, $0<b4<1$, $0<c2<1$, $0<d<5$) such as $Li_{3.25}Ge_{0.25}P_{0.75}S_4$, lithium nitride ($Li_{a5}N_{b5}$, $0<a5<4$, $0<b5<2$) such as $Li_3N$, $SiS_2$ series glass ($Li_{a6}Si_{b6}Sc_3$, $0<a6<3$, $0<b6<2$, $0<c4<4$) such as $Li_3PO_4$—$Li_2S$—$SiS_2$, $P_2S_5$ series glass ($Li_{a7}P_{b7}S_{c5}$, $0<a7<3$, $0<b7<3$, $0<c5<7$) such as $LiI$—$Li_2S$—$P_2S_5$ or the mixture thereof may be used.

Lithium Secondary Battery

The lithium secondary battery according to another aspect of the present disclosure comprises a positive electrode, a negative electrode, a separator interposed between the positive electrode and the negative electrode, and a gel polymer electrolyte. Since the gel polymer electrolyte is the same as the above description, a detailed description will be omitted.

Positive Electrode

The positive electrode may be prepared by coating a slurry of a mixture for a positive electrode including a positive electrode active material, a binder, an electrically conductive material, and a solvent on the positive electrode current collector.

The positive electrode current collector is not particularly limited as long as it has electrical conductivity without causing chemical changes in the battery. For example, stainless steel, aluminum, nickel, titanium, sintered carbon; or aluminum or stainless steel surface-treated with carbon, nickel, titanium, silver or the like may be used as the positive electrode current collector.

The positive electrode active material is a compound capable of reversibly intercalating and deintercalating lithium, and specifically, may comprise lithium composite metal oxide comprising lithium and at least one metal such as cobalt, manganese, nickel, or aluminum. More specifically, the lithium composite metal oxide may be lithium-manganese-based oxide (e.g. $LiMnO_2$, $LiMn_2O_4$, etc.), lithium-cobalt-based oxide (e.g. $LiCoO_2$, etc.), lithium-nickel-based oxide (e.g. $LiNiO_2$, etc.), lithium-nickel-manganese-based oxide (e.g. $LiNi_{1-Y1}Mn_{Y1}O_2$ (wherein $0<Y1<1$), $LiMn_{2-z1}Ni_{z1}O_4$ (wherein $0<Z1<2$) etc.), lithium-nickel-cobalt-based oxide (e.g., $LiNi_{1-Y2}CO_{Y2}O_2$ (wherein $0<Y2<1$) etc.), lithium-manganese-cobalt-based oxide (e.g., $LiCo_{1-Y3}Mn_{Y3}O_2$ (wherein $0<Y3<1$), $LiMn_{2-z2}Co_{z2}O_4$ (wherein $0<Z2<2$) etc.), lithium-nickel-manganese-cobalt-based oxide (e.g., $Li(Ni_{p1}CO_{q1}Mn_{r1})O_2$ (wherein $0<p1<1$, $0<q1<1$, $0<r1<1$, $p1+q1+r1=1$) or $Li(Ni_{p2}CO_{q2}Mn_{r2})O_4$ (wherein $0<p2<2$, $0<q2<2$, $0<r2<2$, $p2+q2+r2=2$) etc.), or lithium-nickel-cobalt-transition metal (M) oxide (e.g., $Li(Ni_{p3}Co_{q3}Mn_{r3}M_{S1})O_2$ (wherein M is selected from the group consisting of Al, Fe, V, Cr, Ti, Ta, Mg, and Mo, and p3, q3, r3, and s1 are the atomic fractions of each independent element, wherein $0<p3<1$, $0<q3<1$, $0<r3<1$, $0<s1<1$, and $p3+q3+r3+s1=1$) etc.), and any one or two or more of these compounds may be comprised.

Among these, when considering that the capacity characteristics and stability of the battery may be increased, the lithium composite metal oxide may be $LiCoO_2$, $LiMnO_2$, $LiNiO_2$, lithium nickel manganese cobalt oxide (e.g., $Li(Ni_{0.6}Mn_{0.2}Co_{0.2})O_2$, $Li(Ni_{0.5}Mn_{0.3}CO_{0.2})O_2$, or $Li(Ni_{0.8}Mn_{0.1}CO_{0.1})O_2$ etc.), or lithium nickel cobalt aluminum oxide (e.g., $LiNi_{0.8}Co_{0.15}Al_{0.05}O_2$ etc.), and when considering the remarkable improvement effect according to the control of the type and content ratio of elemental elements forming lithium composite metal oxide, the lithium composite metal oxide may be $Li(Ni_{0.6}Mn_{0.2}CO_{0.2})$ $O_2$, $Li(Ni_{0.5}Mn_{0.3}CO_{0.2})O_2$, $Li(Ni_{0.7}Mn_{0.15}CO_{0.15})O_2$ or $Li(Ni_{0.8}Mn_{0.1}Co_{0.1})O_2$, and any one or a mixture of two or more of these may be used.

The positive electrode active material may be contained in an amount of 60 to 99 wt %, preferably 70 to 99 wt %, more preferably 80 to 98 wt %, based on the total weight of the solids excluding the solvent in the slurry of the mixture for the positive electrode.

The binder is a component that assists in bonding of an active material and an electrically conductive material, and bonding to a current collector.

Examples of such binder may comprise polyvinylidene fluoride, polyvinyl alcohol, carboxymethylcellulose (CMC), starch, hydroxypropyl cellulose, regenerated cellulose, polyvinyl pyrrolidone, tetrafluoroethylene, polyethylene, polypropylene, ethylene-propylene-diene terpolymer (EPDM), sulfonated-EPDM, styrene-butadiene rubber, fluorine rubber, and various copolymers.

Typically, the binder may be contained in an amount of 1 to 20 wt %, preferably 1 to 15 wt %, more preferably 1 to 10 wt %, based on the total weight of the solids excluding the solvent in the slurry of the mixture for the positive electrode.

The electrically conductive material is a component for further improving the electrical conductivity of the positive electrode active material.

The electrically conductive material is not particularly limited as long as it has electrical conductivity without causing chemical changes in the battery, and for example, graphite; carbon-based material such as carbon black, acetylene black, Ketjen black, channel black, furnace black, lamp black, and thermal black; electrically conductive fibers such as carbon fibers and metal fibers; metal powders such as carbon fluoride, aluminum, and nickel powder; electrically conductive whiskers such as zinc oxide and potassium titanate; electrically conductive metal oxides such as titanium oxide; and electrically conductive materials such as polyphenylene derivatives may be used. Specific examples of commercially available electrically-conductive materials may include acetylene black series of products from Chevron Chemical Company or Denka black (Denka Singapore Private Limited), products form Gulf Oil Company, Ketjen black, EC series (products from Armak Company), Vulcan XC-72 (products from Cabot Company) and Super P (products of Timcal Company).

Typically, the electrically conductive material may be contained in an amount of 1 to 20 wt %, preferably 1 to 15 wt %, and more preferably 1 to 10 wt %, based on the total weight of the solids excluding the solvent in the slurry of the mixture for the positive electrode.

The solvent may comprise an organic solvent such as N-methyl-2-pyrrolidone (NMP), and may be used in an amount to achieve a desirable viscosity when the positive electrode active material, and optionally the binder, the electrically conductive material and the like are comprised. For example, the solvent may be comprised in an amount such that the concentration of solids containing the positive electrode active material, and optionally the binder and the electrically conductive material is 50 to 95 wt %, preferably 70 to 95 wt %, more preferably 70 to 90 wt %.

Negative Electrode

The negative electrode is manufactured, for example, by coating a slurry of a mixture for a negative electrode comprising a negative electrode active material, a binder, an electrically conductive material, and a solvent on a negative electrode current collector, or a graphite electrode made of carbon (C) or a metal itself may be used as a negative electrode.

For example, when manufacturing the negative electrode by coating the slurry of the mixture for the negative electrode on the negative electrode current collector, the negative electrode current collector generally has a thickness of 3 to 500 µm. This negative electrode current collector is not particularly limited as long as it has high electrical conductivity without causing chemical changes in the battery. For example, copper, stainless steel, aluminum, nickel, titanium, sintered carbon; copper or stainless steel whose surface is treated with carbon, nickel, titanium, silver or the like; aluminum-cadmium alloy or the like may be used as the negative electrode current collector. In addition, as with the positive electrode current collector, the negative electrode current collector may be strengthened in the bonding force with the negative electrode active material by forming fine irregularities on the surface, and may be used in various forms such as film, sheet, foil, net, porous body, foam, nonwoven fabric and the like.

The negative electrode active material may be one or two or more negative electrode active materials selected from the group consisting of natural graphite, artificial graphite, carbonaceous materials; lithium-containing titanium composite oxide (LTO), Si, $SiO_x$, Sn, Li, Zn, Mg, Cd, Ce, Ni, or Fe metals (Me); alloys composed of the above metals (Me); the above metals (Me) oxide ($MeO_x$); and a composite of the above metals (Me) and carbon.

The negative electrode active material may be contained in an amount of 60 to 99 wt %, preferably 70 to 99 wt %, more preferably 80 to 98 wt %, based on the total weight of the solids excluding the solvent in the slurry of the mixture for the negative electrode.

The binder is a component that assists in bonding between the electrically conductive material, the active material, and the current collector. Examples of such binder may comprise polyvinylidene fluoride (PVDF), polyvinyl alcohol, carboxymethylcellulose (CMC), starch, hydroxypropylcellulose, recycled cellulose, polyvinylpyrrolidone, tetrafluoroethylene, polyethylene, polypropylene, ethylene-propylene-diene polymer. (EPDM), sulfonated-EPDM, styrene-butadiene rubber, fluorine rubber, and various copolymers thereof.

Typically, the binder may be contained in an amount of 1 to 20 wt %, preferably 1 to 15 wt %, and more preferably 1 to 10 wt %, based on the total weight of the solids excluding the solvent in the slurry of the mixture for the negative electrode.

The electrically conductive material is a component for further improving the electrical conductivity of the negative electrode active material. Such an electrically conductive material is not particularly limited as long as it has electrical conductivity without causing chemical changes in the battery, and may be, for example, graphites such as natural graphite or artificial graphite; carbon blacks such as acetylene black, Ketjen black, channel black, furnace black, lamp black, and thermal black; electrically conductive fibers such as carbon fiber or metal fiber; metal powders such as carbon fluoride, aluminum, and nickel powder; electrically conductive whiskers such as zinc oxide and potassium titanate; electrically conductive metal oxides such as titanium oxide; or electrically conductive materials such as polyphenylene derivatives.

The electrically conductive material may be contained in an amount of 1 to 20 wt %, preferably 1 to 15 wt %, and more preferably 1 to 10 wt %, based on the total weight of the solids excluding the solvent in the slurry of the mixture for the negative electrode.

The solvent may comprise water or an organic solvent such as N-methyl-2-pyrrolidone (NMP), and may be used in an amount to achieve a desirable viscosity when the negative electrode active material, and optionally the binder, the electrically conductive material and the like are comprised. For example, the solvent may be comprised in an amount such that the concentration of solids containing the negative electrode active material, and optionally the binder and the electrically conductive material is 50 to 95 wt %, preferably 70 to 90 wt %.

When the metal itself is used as the negative electrode, the negative electrode may be a metal thin film itself, or may be manufactured by physically bonding, rolling, or depositing a metal on the negative electrode current collector. The deposition method may be an electrical vapor deposition or a chemical vapor deposition for metal.

For example, the metal thin film itself or the metal bonded/rolled/deposited on the negative electrode current collector may comprise one metal or an alloy of two metals selected from the group consisting of lithium (Li), nickel (Ni), tin (Sn), copper (Cu), and indium (In).

Separator

In the lithium secondary battery according to another aspect of the present disclosure, as the separator, a conventional porous polymer film conventionally used as a separator, for example, a porous polymer film made of a polyolefin-based polymer such as ethylene homopolymer, propylene homopolymer, ethylene/butene copolymer, ethylene/hexene copolymer, and ethylene/methacrylate copolymer may be used alone or they may be laminated and used, or a conventional porous nonwoven fabric, for example, a non-woven fabric made of high melting glass fibers, polyethylene terephthalate fibers, or the like may be used, but is not limited thereto.

In addition, the external shape of the lithium secondary battery of another aspect of the present disclosure is not particularly limited, but may be a cylindrical shape using a may, a square shape, a pouch shape, or a coin shape.

Also, according to another embodiment of another aspect of the present disclosure, another aspect of the present disclosure provides a battery module including the lithium secondary battery as a unit cell and a battery pack including the same. Since the battery module and the battery pack include the lithium secondary battery having high capacity, high rate characteristics and cycle characteristics, they may be used as a power source for a medium or large-sized device selected from the group consisting of an electric vehicle, a hybrid electric vehicle, a plug-in hybrid electric vehicle, and a power storage system.

Hereinafter, the present invention will be described in more detail through specific examples. However, the following examples are only illustrated to aid understanding of the present invention, and do not limit the scope of the present invention. It is obvious to those skilled in the art that various changes and modifications are possible within the scope of the present disclosure and the scope of the technical idea, and it is natural that such changes and modifications are within the scope of the appended claims.

Synthesis Example 1: Preparation of Acrylic Copolymer Containing Hydroxy Terminal (P1)

To a 500 mL round-bottom flask, 5.0 g of 2-hydroxyethyl-α-bromoisobutyrate, 30 g of 2-methoxyethyl acrylate (MEA), 120 g of butyl acrylate (BA), and 160 g of dimethyl formamide (DMF) were added. Dissolved oxygen was removed through nitrogen bubbling at room temperature for 30 minutes. The reactor was sealed and heated to 60° C. 1.71 g of CuBr, and 2.07 of N,N,N',N'',N''-pentamethyldiethylenetriamine (PMDETA) were dissolved in DMF to prepare a complex compound, oxygen was removed by nitrogen bubbling, and then added to a reaction flask, and the reaction was allowed to start. After the reaction for 3 hours, the reaction was terminated, precipitated in cold methanol to obtain a polymer, and dried under vacuum at room temperature (number average molecular weight Mn 5800).

Example 1: Preparation of Polymer for Gel Polymer Electrolyte, Graft Copolymer (A1)

50 mL of anhydrous tetrahydrofuran (THF) was added to a dried 100 mL flask, and 0.8 g of NaH (60%) was added in portions and stirred for 1 hour. Thereafter, 10 g of hydroxy-terminated PDMS (polydimethylsiloane, MCR-C18, manufactured by Gelest) and 10 g of hydroxy-terminated acrylic copolymer P1 of Synthesis Example 1 were added, followed by stirring at room temperature for 2 hours. As a fluoropolymer, 2.3 g of PCTFE (Polymerscience, Halocarbon 1000 N) was diluted in 10 mL of THF, added, and stirred at room temperature for 19 h to complete the reaction.

After completion of the reaction, a small amount of water was added to quench unreacted NaH, extracted with water and dimethyl chloride (MC), and the organic layer was dried with anhydrous $MgSO_4$. Thereafter, distillation under reduced pressure and drying under vacuum at room temperature were performed to obtain a fluoropolymer (A1) in which a side chain containing a siloxane group and a side chain containing an acrylic polymer were introduced into the fluoropolymer chain. The composition of the prepared fluoropolymer (A1) is as shown in Table 1 below.

Example 2: Preparation of Polymer for Gel Polymer Electrolyte, Graft Copolymer (A2)

The reaction was carried out in the same manner as in Example 1 to obtain a fluoropolymer (A2), except that in Example 1, the amounts of the hydroxy-terminated PDMS and the hydroxy-terminated acrylic copolymer P1 were changed to 5 g and 15 g, respectively.

Example 3: Preparation of Polymer for Gel Polymer Electrolyte, Graft Copolymer (A3)

The reaction was carried out in the same manner as in Example 1 to obtain a fluoropolymer (A3), except that in Example 1, amine-terminated PDMS (MCR-A11, manufactured by Gelest) was used instead of hydroxy-terminated PDMS.

Comparative Example 1: Preparation of Polymer for Gel Polymer Electrolyte, Graft Copolymer (B1)

The reaction was carried out in the same manner as in Example 1 to obtain a fluoropolymer (B1), except that in Example 1, 20 g of hydroxy-terminated PDMS is added, and no acrylic copolymer is added.

Comparative Example 2: Preparation of Polymer for Gel Polymer Electrolyte, Graft Copolymer (B2)

The reaction was carried out in the same manner as in Example 1 to obtain a fluoropolymer (B2), except that in Example 1, no hydroxy-terminated PDMS is added, and 20 g of acrylic copolymer P1 is added.

TABLE 1

|  | Example 1 A1 | Example 2 A2 | Example 3 A3 | Comparative Example 1 B1 | Comparative Example 2 B2 |
| --- | --- | --- | --- | --- | --- |
| Fluoropolymer | PCTFE | PCTFE | PCTFE | PCTFE | PCTFE |
| siloxane-based branch | MCR-C18 | MCR-C18 | MCR-A11 | MCR-C18 | — |

TABLE 1-continued

|  | Example 1 A1 | Example 2 A2 | Example 3 A3 | Comparative Example 1 B1 | Comparative Example 2 B2 |
|---|---|---|---|---|---|
| Acrylic (monomer weight ratio) | BA/MEA (80/20) | BA/MEA (80/20) | BA/MEA (80/20) | — | BA/MEA (80/20) |
| Fluorine-based/siloxane-based/acrylic weight ratio | 10/45/45 | 10/22.5/67.5 | 10/45/45 | 10/90/0 | 10/0/90 |
| Mw (PdI) | 16,000 (1.4) | 16,000 (1.5) | 15,000 (1.4) | 12,000 (1.3) | 17,000 (1.5) |

*Mw: Weight average molecular weight
*PDI: Poly Dispersity Index

Example 4 to 7: Preparation of Gel Polymer Electrolyte (1) Preparation of Composition for Gel Polymer Electrolyte Ethylene carbonate (EC) and ethylmethyl carbonate (EMC) were mixed in a volume ratio of 3:7, and 1 M of $LiPF_6$ was added to prepare a mixed solvent, and then the mixed solvent prepared above, the polymers for the gel polymer electrolyte of Examples 1 to 3, a polymerization initiator (AIBN), and additives were mixed in the composition ratio shown in Table below to prepare a composition for a gel polymer electrolyte. As the additives, vinylene carbonate (VC) and trimethylopropane triacrylate (TMPTA) were used.

(2) Manufacture of Lithium Secondary Battery 97.5 wt % of positive electrode active material ($LiNi_{0.8}Co_{0.1}Mn_{0.1}O_2$; NCM), 1.5 wt % of carbon black as an electrically conductive material, 1 wt % of PVDF as a binder were added to N-methyl-2-pyrrolidone (NMP) as a solvent to prepare a slurry of the mixture for the positive electrode. The slurry of the mixture for the positive electrode was applied to a thin film of aluminum (Al), which is a positive electrode current collector having a thickness of about 20 μm, and dried, and then roll-pressed to manufacture a positive electrode.

Next, an artificial graphite electrode was used as a negative electrode.

An electrode assembly was manufactured using the positive electrode, the negative electrode, and a separator made of polyethylene (PE). After injecting the prepared composition for a gel polymer electrolyte into the electrode assembly, it was left to stand for 2 days and then heated at ° C. for 24 hours to manufacture a lithium secondary battery containing a gel polymer electrolyte.

Comparative Example 3 to 4

Ethylene carbonate (EC) and ethylmethyl carbonate (EMC) were mixed in a volume ratio of 3:7, and 1 M $LiPF_6$ was added to prepare a mixed solvent, and then the mixed solvent prepared above, the polymers of Comparative Examples 1 to 2, and a polymerization initiator (AIBN) and other additives were mixed in the composition ratio shown in Table 2 below to prepare a composition for a gel polymer electrolyte.

Thereafter, a lithium secondary battery comprising a gel polymer electrolyte was prepared by the method shown in the method for manufacturing the lithium secondary battery.

Examples 4 to 7 and Comparative Examples 3 to 4 are shown in Table 2 below.

TABLE 2

| Unit: wt % | Polymer for the gel polymer electrolyte | Polymerization initiator (AIBN) | Additive (VC/TMPTA) | Solvent |
|---|---|---|---|---|
| Example 4 | A1 | 1 | 0.5 | 2.5/0.5 | 95.5 |
| Example 5 | A2 | 1 | 0.5 | 2.5/0.5 | 95.5 |
| Example 6 | A3 | 1 | 0.5 | 2.5/0.5 | 95.5 |
| Comparative Example 3 | B1 | 1 | 0.5 | 2.5/0.5 | 95.5 |
| Comparative Example 4 | B2 | 1 | 0.5 | 2.5/0.5 | 95.5 |

Experimental Example 1: Evaluation of Solubility of Polymer for Gel Polymer Electrolyte The gel polymer electrolytes prepared in Examples 4 to 6 and Comparative Examples 3 to 4 were visually observed to evaluate the solubility, and the results are shown in Table 3 below.

Experimental Example 2: Evaluation of Stability at High Temperature of Gel Polymer Electrolyte The electrolyte solutions prepared in Examples 4 to 6 and Comparative Examples 3 to 4 were added to an oven at 60° C. installed in an environment with a humidity of 40% and a temperature of 24° C. and left for 24 hours. Thereafter, the shape of the gel polymer electrolytes was visually observed.

Experimental Example 3: Measurement of Ionic Conductivity of Gel Polymer Electrolyte Using the gel polymer electrolytes prepared in Examples 4 to 6 and Comparative Examples 3 to 4, specimens for measuring ionic conductivity were prepared. The specimens were manufactured collectively through ASTM standard D638 (Type V specimens).

Subsequently, a gold (Au) electrode was coated on the top of the specimen in a circle having a diameter of 1 mm by using a sputter method, and an AC impedance measurement method was applied at 25° C. The ion conductivity was measured in a frequency band of 100 MHz to 0.1 Hz by a VMP3 measuring device and a precision impedance analyzer (4294A). The measurement results are shown in Table 3 below.

Experimental Example 4: Evaluation of Electrochemical Stability of Gel Polymer Electrolyte For the lithium secondary batteries prepared in Examples 4 to 6 and Comparative Examples 3 to 4, respectively, electrochemical (oxidation) stability according to linear sweep voltammetry (LSV) was measured. A potentiostat (EG&G, model 270A) was used as a measuring device, and the measurement temperature was 60° C. The results are shown in Table 3 below.

Experimental Example 5: Evaluation of Stability of Electrode (Evaluation of Stability at High Temperature, Measurement of Calorific Value)

The lithium secondary batteries prepared in Examples 4 to 6 and Comparative Examples 3 to 4 were 100% charged under a voltage condition of 4.25 V. Thereafter, the temperature was increased from 25° C. at a rate of increase of 0.7° C./min and the temperature was maintained for 100 minutes in a temperature range around 120° C. (first temperature holding section).

Thereafter, the temperature was raised again at a temperature increase rate of 0.7° C./min, and the temperature was maintained in a temperature range around 150° C. (second temperature holding section).

Thereafter that, the lithium secondary battery was exposed to high temperature through a step of raising the temperature at a rate of 0.7° C./min and maintaining the temperature in a temperature range around 200° C. (third temperature holding period), and then the calorific value inside the lithium secondary battery was measured and shown in Table 3 below.

TABLE 3

| | Solubility | High temperature stability | Ion conductivity (S/cm) | On-Set Voltage (V) | Calorific value of battery (J) |
|---|---|---|---|---|---|
| Example4 | ○ | ○ | $6.5*10^{-3}$ | 5.06 | 66 |
| Example5 | ○ | ○ | $6.5*10^{-3}$ | 4.98 | 85 |
| Example6 | ○ | ○ | $6.3*10^{-3}$ | 5.02 | 61 |
| Comparative Example3 | x | —* | —* | —* | x |
| Comparative Example4 | ○ | ○ | $6.3*10^{-3}$ | 4.95 | 95 |

[Solubility evaluation criteria]
○: Maintenance of transparent state of electrolyte solution
Δ: Polymer does not sink, but becomes opaque
x: Separated from electrolyte solution because polymer is not dissolved
[Evaluation standard of high temperature stability]
○: Maintenance of transparent state of electrolyte solution;
Δ: Electrolyte solution changes color to light yellow, or precipitation occurs somewhat;
x: Browning of electrolyte solution is severe, or sedimentation occurs
*The polymer is not dissolved in the electrolyte solution, so further evaluation is not conducted As shown in Table 3, it was confirmed that since the gel polymer electrolyte of Examples 4 to 6 contains a copolymer containing a main chain containing a fluoropolymer and a side chain containing an acrylic polymer in addition to a siloxane group, it showed high solubility in electrolyte solution and excellent stability at high temperature.

In addition, it was confirmed that the gel polymer electrolyte of Examples 4 to 6 had excellent oxidation stability and reduced heat generation of the positive electrode, resulting in improved high temperature stability of the lithium secondary battery, and thus it may be stably applied as an electrolyte.

On the other hand, it was confirmed that the gel polymer electrolyte in Comparative Example 3 is the case where only a main chain containing a fluoropolymer and a side chain containing a siloxane group are comprised, and thus it is not dissolve in the electrolyte solution with low polarity of the polymer, and it is impossible to apply it as an additive of the electrolyte solution.

In addition, it was confirmed that the gel polymer electrolyte of Comparative Example 4 is the case where only the main chain containing the fluoropolymer and the side chain containing the acrylic polymer are comprised, and thus the side reaction of the electrolyte may not be suppressed under high temperature conditions after exposure to normal humidity.

The invention claimed is:

1. A polymer for a gel polymer electrolyte, comprising:
    a copolymer having a main chain and a first side chain and a second side chain bonded to the main chain, wherein the main chain comprises a fluoropolymer, wherein the first side chain comprises a siloxane group grafted to the main chain, and wherein the second side chain comprises an acrylic polymer.

2. The polymer for the gel polymer electrolyte according to claim 1, wherein the fluoropolymer is represented by Formula 3 below:

[Formula 3]

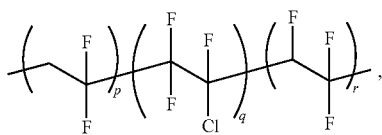

wherein p, q, and r are each independently real numbers of 0≤p≤20,000, 1≤q≤22,000, and 0≤r≤15,000.

3. The polymer for the gel polymer electrolyte according to claim 1, wherein the copolymer is represented by Formula 1 below:

[Formula 1]

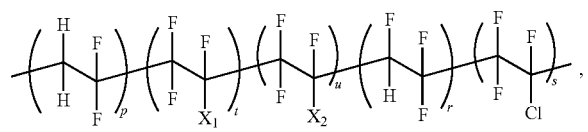

wherein p, r, s, t, and u are each independently real numbers of 0≤p≤20,000, 0≤r≤15,000, 0≤s≤22,000, and 0<t+u≤22,000, $X_1$ is the first side chain represented by following Formula 2,

[Formula 2]

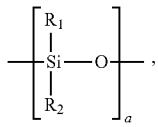

$X_2$ is the second side chain, and $R_1$ and $R_2$ are each independently hydrogen, $C_1$ to $C_6$ alkyl, $C_1$ to $C_6$ alkoxy, or phenyl, and a is a real number of 2 to 400.

4. The polymer for the gel polymer electrolyte according to claim 1, wherein the molecular weight of the copolymer is 500 to 2,000,000.

5. The polymer for the gel polymer electrolyte according to claim 1, wherein the acrylic polymer contains a polymerization unit of acrylic monomer in an amount of 30 wt % or more.

6. The polymer for the gel polymer electrolyte according to claim 5, wherein the acrylic monomer comprises at least one selected from the group consisting of acrylic acid, methacrylic acid, and derivatives thereof.

7. The polymer for the gel polymer electrolyte according to claim 1, wherein the weight ratio of the main chain containing the fluoropolymer and the side chain containing the siloxane group and the side chain containing the acrylic polymer is 1:99 to 30:70.

8. The polymer for the gel polymer electrolyte according to claim 1, wherein a weight ratio of the first side chain to the second side chain is 1:99 to 80:20.

9. A gel polymer electrolyte comprising the polymer of claim 1.

10. The gel polymer electrolyte according to claim 9, wherein a content of the polymer is 0.01 to 5 wt % based on a total weight of the gel polymer electrolyte.

11. A lithium secondary battery, comprising:
a positive electrode;
a negative electrode;
a separator interposed therebetween; and
the gel polymer electrolyte of claim 9.

* * * * *